United States Patent Office

3,393,253
Patented July 16, 1968

3,393,253
UREIDOPHOSPHONATES AND PREPARATION THEREOF
Robert A. Wiesboeck, Atlanta, Ga., assignor, by mesne assignments, to Armour Agricultural Chemical Company, a corporation of Delaware
No Drawing. Filed July 2, 1965, Ser. No. 469,345
9 Claims. (Cl. 260—938)

ABSTRACT OF THE DISCLOSURE

Ureidophosphonates are prepared by dissolving chlorourea in a solvent such as, for example, acetonitrile, hydrofuran and dioxene, adding a trithiophosphite ester such as, for example, trimethylphosphite and triethylphosphite with agitation at a temperature of about 0 to 20° C. and recovering the precipitate as product.

---

This invention relates to the reaction of chlorourea with phosphite esters and phosphines, and more particularly to the preparation of dialkyl ureidophosphonates and dialkyl ureidothiophosphonates useful as herbicides, pesticides, germicides, and for other uses.

The chemistry of chlorourea as reported in the literature is restricted to aqueous or alcoholic systems. I have discovered that by using aprotic solvents, new reactions of chlorourea are obtained, resulting in the preparation of a new class of compounds. The composition and structure of the compounds can be represented by the formulas:
(I) $(RO)_2P(O)NR'CONR''R'''$
(II) $(RO)(RS)P(O)NR'CONR''R'''$ or $(RO)_2P(S)NR'CONR''R'''$
(III) $(RO)(RS)P(S)NR'CONR''R'''$
(IV) $(RS)_2P(S)NR'CONR''R'''$
In the above, R = (methyl, ethyl, etc.)
R′, R″, R‴ = H, alkyl, aryl The handling of chlorourea has heretofore presented a problem with respect to isolation and storage. If it were possible to produce chlorourea in situ, a substantial advance would be achieved.

An object of the invention is to prepare a new class of compounds, namely, dialkyl ureidophosphonates and dialkyl ureidothiophosphonates. A further object is to provide a process for the preparation of such compounds. Yet another object is to eliminate the problem of handling of chlorourea by producing it in situ. Other specific objects and advantages will appear as the specification proceeds.

In one modification of the process, the new class of compounds, as indicated in the above Formulas I–IV, is prepared from chlorourea and an alkyl phosphite or thiophosphite ester in an aprotic solvent according to the following equations:

$(RO)_3P + ClNR'CONR''R''' \rightarrow I + RCl$
$(RS)(RO)_2P + ClNR'CONR''R''' \rightarrow II + RCl$
$(RS)_2(RO)P + ClNR'CONR''R''' \rightarrow III + RCl$
$(RS)_3P + ClNR'CONR''R''' \rightarrow IV + RCl$ In the operation, the temperature is kept between 0° C. and 20° C. during the exothermic reaction using external cooling. The derivatives with carbon chain length below four are found to precipitate directly from the solution. All the others are obtained by concentration in vacuum, and preferably by the addition of acetone or water. The products are stable crystalline solids.

Any suitable aprotic solvents may be employed, and as examples acetonitrile, tetrahydrofuran, and dioxane may be mentioned. In acetonitrile, chlorourea can be prepared by chlorination of a urea suspension. If a 100% excess of urea is used, the unreacted urea serves as a buffer which improves the stability of the chlorourea-acetonitrile system. The chlorourea-acetonitrile solution was used directly for the reactions with the phosphorus compounds, thereby eliminating the isolation and storage problems of chlorourea.

By way of example, tertiary alkyl phosphites and chlorourea react exothermally to produce dialkyl ureidophosphonates.

$(RO)_3P + ClNHCONH_2 \rightarrow$
$(RO)_2(O)P—NHCONH_2 + RCl$ (1)

The products usually precipitate from the reaction mixture in good to moderate yields. They were identified by infrared absorption and elemental analysis. The infrared spectra show a strong N—H stretch at 2.9–3.0, C=O at 5.9–6.0, N—H deformation at 6.2, P→O at 8.1–8.2, and P—O—C at 9.8–10.0μ. The evolved halocarbons were identified by boiling point and infrared absorption.

The reaction is believed to involve displacement of the halogen by the phosphite to form a phosphonium compound.

$(RO)_3P + ClNHCONH_2 \rightarrow (RO)_3P^+—NHCONH_2Cl^-$ (2)

Nucleophilic attack by the halide ion on the alkyl carbon would lead to the observed products dialkyl ureidophosphonates and haloalkane. This assumption is substantiated by the behavior of triphenylphosphine towards chlorourea as described below. The formation of dialkyl ureidophosphonates from chlorourea and phosphites essentially represents a Michaelis-Arbuzov reaction with an N—Cl compound instead of the well known C—Cl in form of a haloalkane, acyl halide or phosgene. It is the first example of a reaction of an N—Cl compound with phosphite esters, according to the published literature.

This route affords a convenient method for the preparation of dialkyl ureidophosphonates from readily available materials. The scope of the reaction was checked by preparing the methyl, ethyl, isopropyl and n-butyl derivative (see Table I). All compounds are stable crystalline solids. They can be recrystallized from aqueous alcohol and are highly resistant towards acid or base hydrolysis. The alkali salts are readily formed with sodium or sodium amide in liquid ammonia.

$(RO)_2OP—NHCONH_2 + NH_2^\ominus \rightarrow$
$(RO)_2OP—N^\ominus CONH_2 + NH_3$ (3)

TABLE I.—PREPARATION OF DIALKYL UREIDOPHOSPHONATES

| Compound | Yield (percent) | M.P. (° C.) |
|---|---|---|
| Methyl | 50 | 184–6 |
| Ethyl | 52 | 208–9 |
| Iso-propyl | 44 | 192–4 |
| n-Butyl | 48 | 175–6 |

Substituted phosphines, such as triphenylphosphine, react with chlorourea to form stable phosphonium salts.

$(C_6H_5)_3P + ClNHCONH_2 \rightarrow$
$(C_6H_5)_3P^\oplus—NHCONH_2Cl^\ominus$ (4)

In contrast to the preceding reaction products of phosphite esters, elimination does not take place. The ureidotriphenylphosphonium compound precipitates from the reaction mixture if acetonitrile is used as the solvent. The infrared absorption pattern is similar to that of triphenylphosphine and urea combined. The carbonyl peak is found at 5.89μ compared to 5.99μ in urea. The compound hydrolyzes readily in water to triphenylphosphine oxide and urea. Butyl lithium or sodium alkoxide produce the corresponding phosphinimine derivative.

$(C_6H_5)_3P^\oplus—NHCONH_2Cl^\ominus + OC_2H_5^\ominus \rightarrow$
$(C_6H_5)_3P=N—CONH_2 + C_2H_5OH + Cl^\ominus$ (5)

Specific examples illustrative of the invention may be set out as follows:

Example I.—Preparation of dimethylureidophosphonate

Chlorourea, 9.4 g., is dissolved in 100 ml. dry acetonitrile or tetrahydrofuran and cooled to 0° C. under a dry atmosphere. A solution of 12.4 g. of trimethylphosphite in 50 ml. acetonitrile is added dropwise with agitation while the temperature is maintained at 0–20° C. The resulting mixture is allowed to stand at ambient temperature for three hours. After storing at 0° C. for five more hours, the precipitate is separated by filtration, washed with cold acetonitrile, and dried in vacuum. The crude product, 10 g., can be recrystallized from five parts hot acetonitrile or water. The fine white needles melt at 186–7° C.

Example II.—Preparation of diethylureidophosphonates

The procedure of Example I is followed, using 9.4 g. of chlorourea and 16.6 g. of triethylphosphite. The product, 9 g., after recrystallization from 15 parts hot water, melted at 208° C.

Example III.—Preparation of Di-n-butyl-ureidophosphonate

The procedure of Example I is followed, using 9.4 g. of chlorourea and 25 g. of tri-n-butylphosphite. The product, 12 g., after recrystallization from 50% aqueous methanol, melted at 175–6° C. A slurry of urea in acetonitrile may be chlorinated at −5 to 0° C. and the resulting solution used directly for the reaction with the phosphorus compound.

Example IV.—Preparation of diethylureido-thiophosphonate

A cold (0° C.) solution of 9.4 g. of chlorourea in 100 ml. acetonitrile is added dropwise to a stirred solution of 18.2 g. of monothioethylphosphite in 100 ml. acetonitrile while maintaining the temperature at −10° C. The resulting mixture is allowed to stand at 20–30° C. for three hours. Removal of the solvent produces a pale yellow oil which is washed three times with 150 ml. portions of carbon tetrachloride. The oil solidifies on drying in high vacuum to a waxy solid, 21.0 g., which melts at 65–70° C.

Example V

The process was carried out as described in Example I except that the chlorourea was produced in situ. A slurry of urea in acetonitrile was chlorinated at −5° C., and the resulting solution was used directly for the reaction with the phosphorus compound.

Example VI

The process was carried out as described in Example IV except that the chlorourea was prepared in situ. A slurry of urea in acetonitrile was chlorinated at 0° C., and the resulting solution was used directly for the reaction with the phosphorus compound.

Example VII.—Preparation of diethylureidodi-thiophosphonate

The procedure of Example VI is followed, using 9.4 g. of chlorourea and 19.8 g. of dithioethylphosphite. The product, 23.0 g., melted at 72–79° C.

Example VIII.—Preparation of diethylureido-trithiophosphonate

The procedure of Example VI is followed, using 9.4 g. of chlorourea and 21.4 g. of triethyltrithiophosphite. The crude product, 18.0 g., was recrystallized from a mixture of acetonitrile and ethanol. The recrystallized compound melted at 89° C., with decomposition.

From the foregoing examples, it will be observed that the dialkyl ureidophosphonates may be prepared from readily available raw materials by an economic procedure requiring only simple operations, such as stirring and filtration, etc., and through the use of an aprotic solvent.

While in the foregoing specification I have set forth procedure in considerable detail for the purpose of illustrating embodiments of the invention, it will be understood that such detail or details may be varied widely by those skilled in the art without departing from the spirit of my invention.

I claim:
1. Dimethylureidophosphonate.
2. Diethylureidophosphonate.
3. Di-n-butylureidophosphonate.
4. Diethylureidothiophosphonate.
5. Diethylureidodithiophosphonate.
6. Diethylureidotrithiophosphonate.
7. In a process for the preparation of dimethyl ureidophosphonate, the steps of dissolving chlorourea in a solvent selected from the group of acetonitrile and hydrofuran, adding trimethyl phosphite thereto with agitation while maintaining the temperature at about 0 to 20° C., storing the resulting mixture until a precipitate is formed and recovering the precipitate.
8. In a process for preparing diethyl ureidophosphonate, the steps of dissolving chlorourea in a solvent selected from the group consisting of acetonitrile and tetrahydrofuran, adding triethylphosphite with agitation while maintaining the temperature at about 0 to 20° C., storing the mixture until precipitation occurs, and recovering the precipitate.
9. In a process for the preparation of diethylureido-trithiophosphonate, the steps of dissolving chlorourea in a solvent selected from the group consisting of acetonitrile and hydrofuran, adding thereto triethyltrithiophosphite with agitation and while maintaining the temperature at about 0 to 20° C., storing the mixture until a precipitate occurs, and recovering the precipitate.

No references cited.

CHARLES B. PARKER, *Primary Examiner.*

A. H. SUTTO, *Assistant Examiner.*

UNITED STATES PATENT OFFICE
CERTIFICATE OF CORRECTION

Patent No. 3,393,253                                        July 16, 1968

Robert A. Wiesboeck

It is certified that error appears in the above identified patent and that said Letters Patent are hereby corrected as shown below:

Column 2, TABLE I, second column, line 2 thereof, "52" should read -- 42 --; line 58, "$(C_6H_5)_3P^{\ominus}$" should read -- $(C_6H_5)_3P^{\oplus}$ --; line 70, "$(C_6H_5)_3P^{\ominus}$" should read -- $(C_6H_5)_3P^{\oplus}$ --.

Signed and sealed this 30th day of December 1969.

(SEAL)
Attest:

Edward M. Fletcher, Jr.                          WILLIAM E. SCHUYLER, JR.
Attesting Officer                                      Commissioner of Patents